(12) United States Patent
Pickel et al.

(10) Patent No.: US 10,095,567 B2
(45) Date of Patent: *Oct. 9, 2018

(54) MICRO CONTROLLER UNIT INCLUDING AN ERROR INDICATOR MODULE

(71) Applicant: FREESCALE SEMICONDUCTOR, INC., Austin, TX (US)

(72) Inventors: Norbert Pickel, Geroldstein (DE); Axel Bahr, Munich (DE); Derek Beattie, Glasgow (GB); Andrew Birnie, Bearsden (GB); Carl Culshaw, Wigan (GB)

(73) Assignee: NXP USA, Inc., Austin, TX (US)

( * ) Notice: Subject to any disclaimer, the term of this patent is extended or adjusted under 35 U.S.C. 154(b) by 180 days.

This patent is subject to a terminal disclaimer.

(21) Appl. No.: 15/144,168

(22) Filed: May 2, 2016

(65) Prior Publication Data
US 2016/0246664 A1    Aug. 25, 2016

Related U.S. Application Data

(63) Continuation of application No. 13/054,344, filed as application No. PCT/IB2008/052849 on Jul. 16, 2008, now Pat. No. 9,329,919.

(51) Int. Cl.
G06F 11/07 (2006.01)
B60R 16/023 (2006.01)
G07C 5/08 (2006.01)

(52) U.S. Cl.
CPC ........ G06F 11/0757 (2013.01); B60R 16/023 (2013.01); G06F 11/0721 (2013.01);
(Continued)

(58) Field of Classification Search
CPC combination set(s) only.
See application file for complete search history.

(56) References Cited

U.S. PATENT DOCUMENTS 3,657,707 A * 4/1972 McFarland ............ B23K 26/08
347/225
5,255,208 A * 10/1993 Thakore ........... G01R 31/31707
701/33.7
(Continued)

FOREIGN PATENT DOCUMENTS

EP    1505608 A1    2/2005
EP    1835403 A     9/2007
(Continued)

OTHER PUBLICATIONS

Sledel, T.J. et al., "The IBM eServer z990 Microprocessor," IBM J. Res. & Dev., vol. 48, No. 314, May/Jul. 2004; downloaded from <<http://citeseerx.ist.psu.edu/viewdoc/download?doi=10.1.1.135.5998&rep=repl&type=pdf>> on Mar. 6, 2014, 15 pages.
(Continued)

Primary Examiner — Amine Riad

(57) ABSTRACT

A micro controller unit including an error indicator hardware module, the error indicator module being arranged to respond to event signals representative of internal and external fault and error events perturbing the micro controller unit function by registering in non-volatile memory a record of the nature of each of the events, wherein the record of the events is inaccessible to alteration.

20 Claims, 3 Drawing Sheets

(52) U.S. Cl.
CPC ...... *G06F 11/0739* (2013.01); *G06F 11/0772* (2013.01); *G07C 5/085* (2013.01)

(56) References Cited

U.S. PATENT DOCUMENTS

| | | | | |
|---|---|---|---|---|
| 5,466,864 | A | 11/1995 | Takemoto et al. | |
| 5,485,625 | A * | 1/1996 | Gumkowski | G06F 1/14 365/227 |
| 6,408,170 | B1 * | 6/2002 | Schmidt | G06F 11/0739 455/344 |
| 6,546,482 | B1 * | 4/2003 | Magro | G06F 11/0721 710/10 |
| 7,235,999 | B2 * | 6/2007 | Goetting | G01R 31/3167 326/14 |
| 7,295,133 | B1 * | 11/2007 | McCollough, Jr. | H04Q 9/00 324/126 |
| 2003/0140285 | A1 * | 7/2003 | Wilkie | G06F 11/0772 714/48 |
| 2005/0251704 | A1 * | 11/2005 | Wagner | G06F 1/24 714/47.2 |
| 2014/0128999 | A1 * | 5/2014 | Schweitzer, III | G05B 9/02 700/79 |
| 2016/0371034 | A1 * | 12/2016 | Kang | G06F 3/0656 |

FOREIGN PATENT DOCUMENTS

| | | |
|---|---|---|
| TW | 544585 | 8/2003 |
| TW | 200535597 | 11/2005 |

OTHER PUBLICATIONS

Rizzolo, R.F. et al., "IBM System z9 eFUSE Applications and Methodology," IBM J. Res. & Dev., vol. 51, No. 1/2, Jan./Mar. 2007; downloaded from <<http://citeseerx.ist.psu.edu/viewdoc/download?doi=10.1.1.135.5998&rep=rep1&type=pdf>> on Mar. 6, 2014, 11 pages.

International Search Report and Written Opinion to corresponding PCT/IB2008/052849, dated Jan. 19, 2009, 14 pages.

* cited by examiner

MICRO CONTROLLER UNIT INCLUDING AN ERROR INDICATOR MODULE

CROSS-REFERENCE TO RELATED APPLICATION(S)

The present application is a continuation of U.S. patent application Ser. No. 13/054,344, entitled "MICRO CONTROLLER UNIT INCLUDING AN ERROR INDICATOR MODULE" filed on Jan. 14, 2011, which is a National Stage Entry under 37 C.F.R. § 371 of PCT/IB2008/052849, filed Jul. 16, 2008, the disclosures of which are hereby expressly incorporated by reference in their entirety.

DESCRIPTION

FIELD OF THE INVENTION

This invention relates to a micro controller unit including an error indicator module.

BACKGROUND OF THE INVENTION

Micro controller units ('MCU') are widely used embedded in systems, such as telephones, clocks, appliances, and vehicles. Input and output devices for an MCU may be discrete switches, relays, or solenoids or other circuits. An MCU may lack any human interface devices at all and, for example, typically does not have keyboards, screens, disks, printers, or other such input/output devices of a personal computer. Micro controllers may control electric motors, relays or voltages, and may read switches, variable resistors, sensors or other electronic devices, for example.

Often, an MCU is a single integrated circuit, commonly with the following features:
one or more central processing units
discrete input and output bits, allowing control or detection of the logic state of an individual package pin
serial communications interfaces such as serial ports and Controller Area Network or other network interfaces for system interconnect
volatile memory ('RAM') for data storage and
Read-Only-Memory ('ROM') or Flash memory for program and operating parameter storage An MCU may also include:
peripherals such as timers, event counters, PWM generators
clock generator
analog-to-digital converters
in-circuit programming and debugging support Although great care is taken to ensure that MCUs are free from faults, in use they are still subject to internal and external faults and errors from causes that may be unrelated to the reliability of the MCU itself but may have external causes, such as electromagnetic interference or temperatures outside the specified operating range, as well as incorrect received signals or commands, for example. However, when an MCU is involved in a failure or error situation, and is returned to the supplier for examination, the original cause is often not present for diagnosis, especially if the fault condition was transient and the product has been removed from the environment where the fault occurred. Not only may this reflect unfairly on the reliability reputation of the product and its supplier, but also time and work is expended uselessly trying and failing to diagnose problems while the real cause goes undetected.

European patent specification 1 505 608 describes a memory system with an error detection interface relating to real time monitoring & collection of failures. Reports of the EASIS consortium on Electronic Architecture and System Engineering for Integrated Automotive Safety Systems describe a software provision for error tracking & logging.

SUMMARY OF THE INVENTION

The present invention provides a micro controller unit including an error indicator hardware module, an electronic system including such an error indicator hardware module, a vehicle including such an electronic system and a method of registering records of events in an error indicator hardware module as described in the accompanying claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
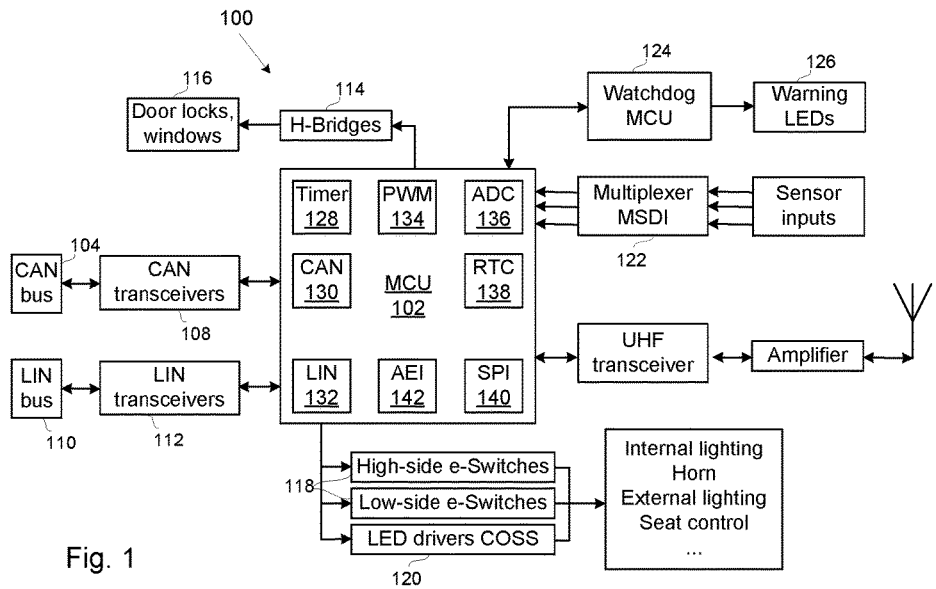
FIG. 1 is a schematic diagram of an example of part of an automotive electronic control system including a micro controller unit.

Electronic control systems with MCUs are used in automotive applications in power train, chassis, and body control modules in various configurations and sizes. The embodiment of the present invention shown in the drawings is applicable to use in automobiles and will be described in relation to such use and specifically to an application to a body control module. However, it will be appreciated that many other uses of this embodiment are possible.

Automotive MCUs vary from small 32 KB read-only memory ('ROM') micro controller devices on tiny printed circuit boards ('PCB's) with limited functionality and periphery up to 2 MB flash high performance modules with large PCBs controlling a great many functions in the automobile. Functionality varies from car to car and architecture to architecture. A centralised architecture tends to include all functions from a hard-wired central board, while a distributed approach interfaces between several PCBs using networks such as FlexRay, Media Oriented Systems Transport ('MOST'), Controller Area Network ('CAN') and Local Interconnect Network ('LIN') networks. Whichever approach is taken, functionality for body control modules, for example, includes such tasks as lighting (both internal and external), heating, ventilation & air-conditioning, window-lift, door lock functionality, and entry & security systems. The size, integration and functionality of such modules continue to increase and grow, and safety and reliability are constant preoccupations, not just for the elementary units but also for the functioning of the systems involved. However, another constant preoccupation is to contain and reduce as far as possible the complexity and cost of the modules. Similar considerations apply to power train (engine and transmission) and chassis (braking, steering, suspension) control modules.

An example of a body control module 100 is shown in FIG. 1. The module 100 comprises an MCU 102 which is programmable to control functions such as window motor drive and lock, rear-view mirror drive and fold, climate control, headlamp alignment and wash, door lock, front and rear lights and others. The MCU 102 communicates over a CAN bus 104 through CAN transceivers 108 and over a LIN bus 110 through LIN transceivers 112 with remote sensors, drivers and actuators. The MCU 102 also drives door locks and windows 116 through H-bridges 114 as well as controlling internal lighting, external lighting, horn and seat position through electronic switches 118 and light-emitting diode ('LED') drivers 120. The MCU receives sensor input signals through a multiplexer 122. A watchdog MCU supervises low voltage and correct software operation of the main MCU 102 and activates LEDs 126 to provide warnings and other indications to the driver of the vehicle.

The MCU includes a timer 128, CAN and LIN interfaces 130 and 132, a pulse width modulator 134, analogue-to-digital and digital-to-analogue converters 136, a real-time clock 138, comprising an oscillator and a resonant circuit or crystal for example, a serial peripheral interface 140 and an automatic error indicator module 142.

Figure 2:
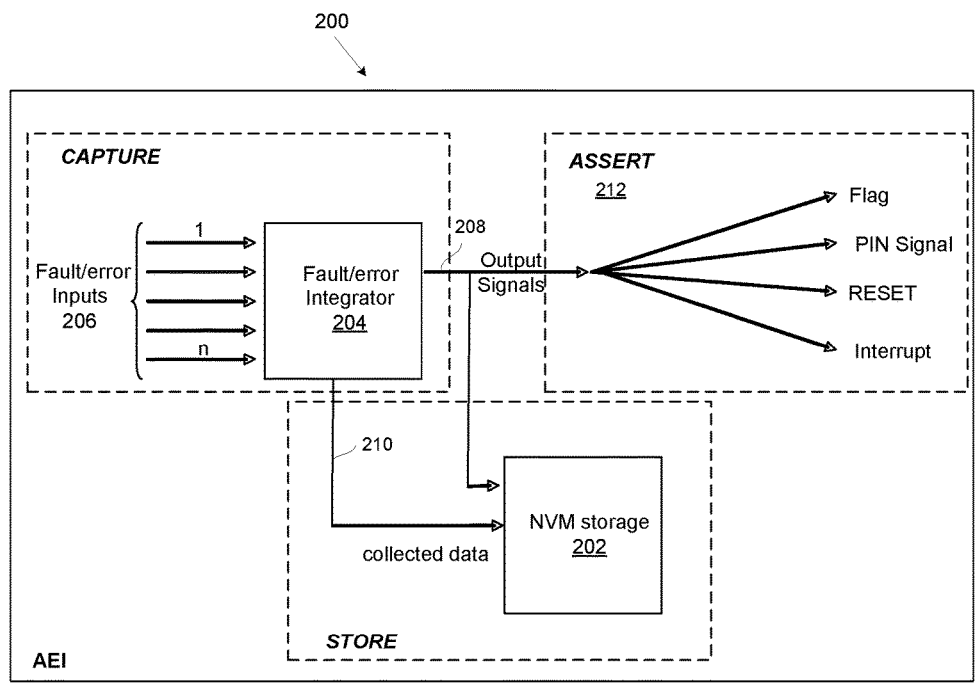
FIG. 2 is a schematic diagram of an error indicator hardware module in a micro controller unit in accordance with an embodiment of the present invention, given by way of example.

An example 200 of the automatic error indicator module 142 is shown in FIG. 2. The error indicator module 200 is a hardware module whose functioning is independent of external influence. The error indicator module 200 is arranged to respond to event signals representative of internal and external fault and error events perturbing the function of the micro controller unit 102 by registering in non-volatile memory ('NVM') 202 a record of the nature of each of the fault and error events, and the record of the events is inaccessible to alteration. Access to the record is read-only and protected by a secured access path. The records of the events can be read and investigated subsequently, even after the MCU 102 with the error indicator module 200 is disconnected from the power supply, and returned to the supplier, for example. This is possible on commercialized vehicles as well as on development and prototype vehicles.

The error indicator module 200 comprises a fault and error integrator 204, which detects occurrence of an event signal representative of a fault or error event applied to its inputs 206 and produces an output signal registering the fact of the event on an output 208 and an output signal identifying data relating to the nature of the event on an output 210. The error indicator module 200 is arranged to respond to the event signals and register the records of the events in the NVM 202 independently of applications and software external to the error indicator module or of user applications running on the MCU 102.

In this embodiment of the invention, the error indicator module 200 also includes an assert module 212 which is selectively responsive to the fault and error event signals to provide output command signals as a function of the nature of the events. For example, depending on the nature of the fault or error event signal, the assert module 212 may supply flag signals, PIN signals, Reset commands or Interrupt commands to the watchdog MCU 124 or directly to modules or applications affected by the events.

In this example of an embodiment of the invention, the error indicator module 200 also responds to the fault or error event signals and registers the records of the events when the event signals are representative of internal and external warnings of potential fault and error events liable to perturb the micro controller unit function, as well as signals representative of actual faults and errors.

In this example of an embodiment of the invention, the error indicator module 200 also responds to the fault or error event signals by registering in the NVM 202 a record of the time of occurrence of the event signal as well as of the nature of the event. The time indication is arranged to be independent of external influence, in particular of external malfunction and is derived from a clock internal to the MCU 102, such as the real time clock 138 or even from a clock specific to the error indicator module 200 which maintains its function, even in the presence of loss of power for example, sufficiently long for the record to be registered in the NVM 202.

In this example of an embodiment of the invention, the error indicator module 200 also responds to fault or error event signals representative of recovery from the fault or error condition and registers the records of the recovery from the events. Combined with the recordal of the times of the events and their recovery, this feature can aid diagnosis of certain fault or error conditions.

The faults that are signalled and recorded in the NVM 202 may be various actual or potential fault conditions, or out-of-specification conditions, externally applied to the microcontroller, which may cause temporary or permanent incorrect operation of the microcontroller. These fault conditions can be the result of incorrect operation of the ECU (electronic control unit) surrounding the microcontroller, including the power supply, clock source, for example, as a result of hardware or software failure or as a result of a malicious attack on the security of the ECU or microcontroller.

Examples of data concerning faults that may be collected using the indications of the event signals and corresponding indications stored in coded form include:
  Low/high voltage warning flag/reset
  ⅗V bit setting
  Low/high frequency detector status
  Temperature detector status
  Interrupt flags
  Software Interrupt
  Error Correcting Code (memory integrity checking)—single & double bit errors
  Processor unit access error
  Pin over/under voltage condition
  Electromagnetic compatibility faults
  Brownout detector The errors that are signalled and recorded in the NVM 202 may be various actual or potential error conditions internal to the microcontroller 102, which has triggered one of the microcontroller's built-in safety/security features. These error conditions could be the result of a fault (as described above) or may be the result of an internal defect in the MCU 102.

Examples of data concerning errors that may be collected using the indications of the event signals and corresponding indications stored in coded form include:

Failure bits
Interrupt flags
Clock quality checker
Self clock mode
Watchdog resets
Illegal address accessed
Illegal instruction used.

Figure 3:
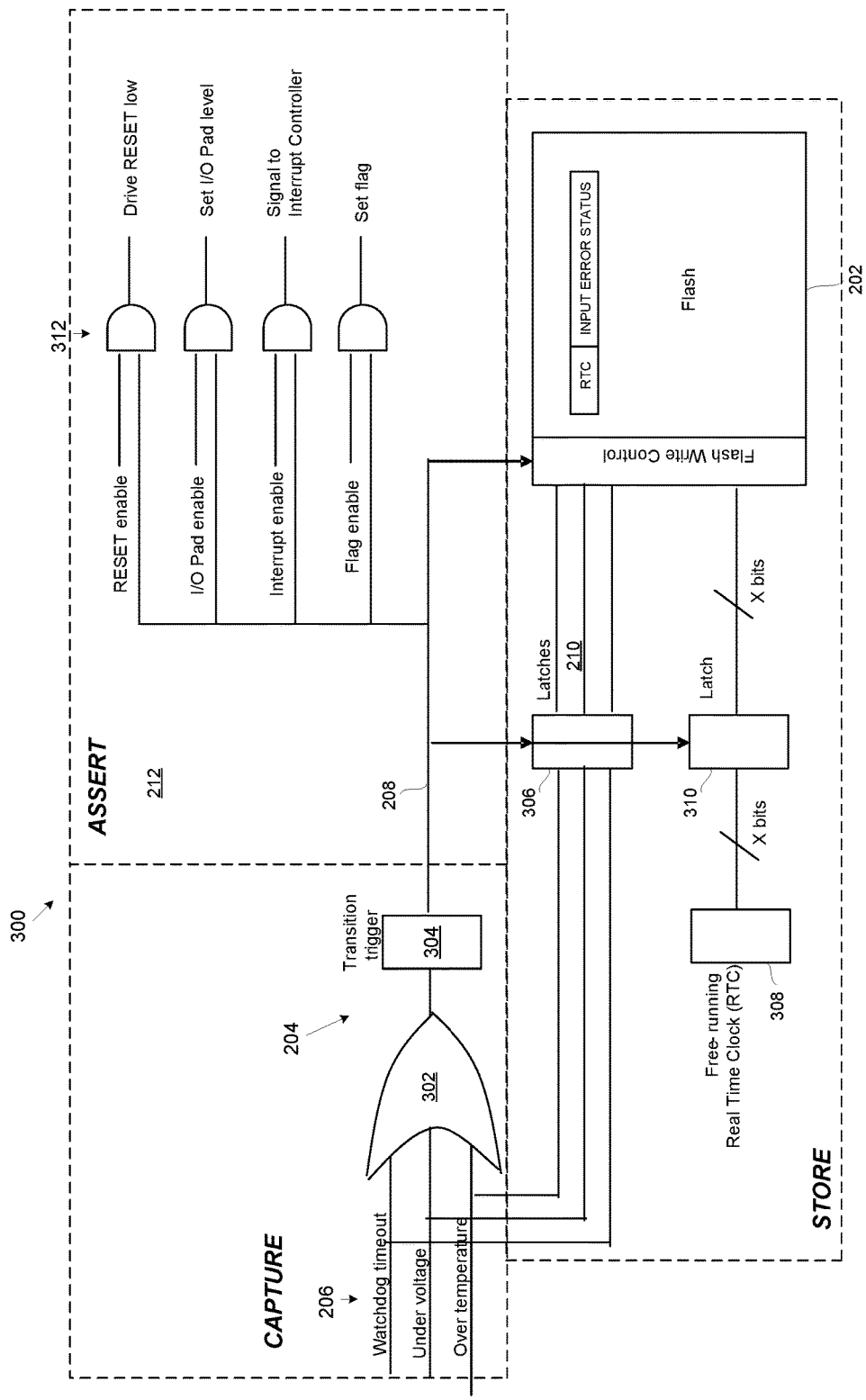
FIG. 3 is a more detailed schematic diagram of the error indicator hardware module of FIG. 2.

FIG. 3 shows an example of an implementation 300 of the error indicator module 200 in more detail. In the error indicator module 300, the fault and error integrator 204 comprises an OR gate 302 which receives on its inputs 206 the fault and error event signals, illustrated here by a watchdog time-out signal, an under-voltage signal and an over-temperature signal. The transition edge corresponding to the occurrence of assertion of a fault or error event signal on any of the inputs 206 causes the OR gate 302 to apply a signal actuating a trigger 304 to produce a trigger signal on the output 208. The inputs 206 also apply the fault and error event signals to latches 306 and application of the trigger signal from the output 208 causes the latches 306 to register data identifying the nature of the particular fault or error event signalled. The error indicator module 300 also includes a free-running, real-time clock 308, whose output is independent of influences external to the MCU 102, and a latch 310. Application of the trigger signal from the output 208 causes the latch 310 to register data identifying the time of occurrence of the fault or error event signal.

The trigger signal at the output 208 is also applied to the NVM 202 to trigger storage in the NVM of the records of the nature and time of the event. In the error indicator module 300, the NVM is a flash memory and the outputs of the latches 306 and 310 are applied to a write control input, which is activated by the trigger signal from the output 208 to write the data from the corresponding latch into the flash memory.

The trigger signal at the output 208 is also applied to one input of each of a set of AND gates 312 in the assert module 212, and the MCU 102 applies to other inputs of the respective AND gates 312 signals selecting the action to be asserted. Accordingly, conjunction at a particular AND gate 312 of the trigger signal and the selection signal from the MCU 102 asserts the output of that AND gate and defines the command signal.

Figure 4:
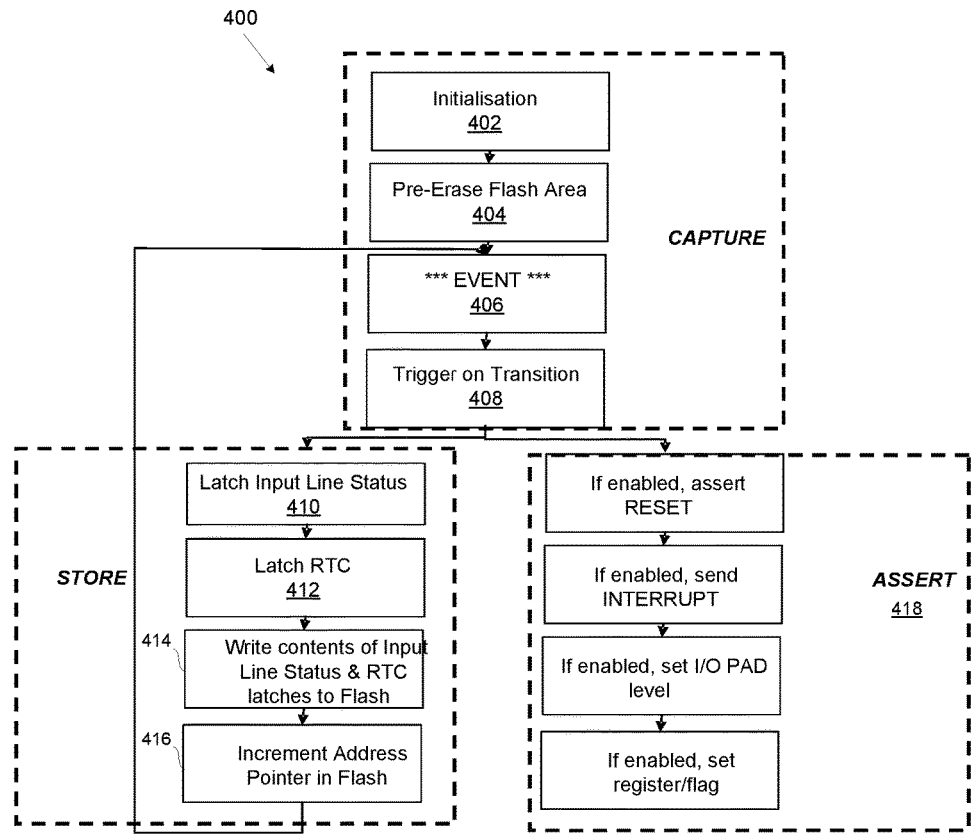
FIG. 4 is a schematic flow chart of a method of registering records of events in the error indicator hardware module of FIG. 2 in accordance with an embodiment of the present invention, given by way of example.

FIG. 4 shows in more detail a method of operation of the error indicator module 300. The sequence 400 starts on power up of the MCU 102 with initialisation of the error indicator module at 402. The inputs to the flash memory area of the NVM 202 are then erased as a preliminary operation at 404, either at the start of each journey or at less frequent intervals, as chosen by the vehicle manufacturer.

The occurrence of a fault or error event as signalled by the transition edge of a fault or error event signal at the inputs 206 is shown at 406, followed by generation at 408 of the trigger signal at the output 208 of the integrator 204.

Generation of the trigger signal at 408 triggers the store operation, starting with latching the status of the fault or error event signals inputs to the latches 306 at 410 and of the time signal input to the latch 310 at 412. The contents of the latches 306 and 310 are then written at 414 into the flash memory of the NVM at an address given by an address pointer of the NVM. The address pointer is then incremented at 416 so that any future event will be written into a different address. The sequence then reverts to waiting for a subsequent event to be signalled at 406.

In addition, generation of the trigger signal at 408 triggers the assert operation at 418, selecting a specific one of the AND gates to actuate to identify the corresponding flag or command.

Figure 5:
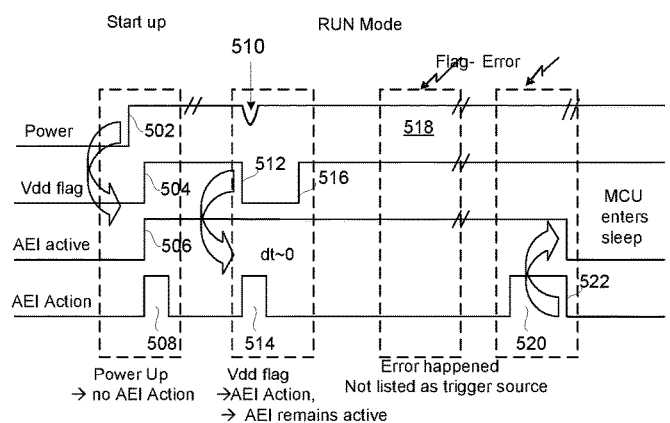
FIG. 5 is a timing chart of different stages of an example of operation of the error indicator hardware module of FIG. 2.

FIG. 5 shows in more detail an example of timing of the operations of FIG. 4. Start up of the MCU 202 occurs when power is switched on at 502. This causes the Vdd_flag signal to be deasserted (high) at 304 and the error indicator module 300 to be activated at 506. The error indicator module 300 then performs a self-test routine at 508 and awaits a fault or error event.

An event is illustrated at 510, being a short dip in the Vdd power of the MCU 202 (called a "brownout" event), signalled by the Vdd_flag signal being asserted (low) at 512. The trigger 304 generates the trigger signal at the output 208, which causes the error indicator module 300 to store the content of the latches 306 and 310 into NVM 202 at 514. The error indicator module 300 remains active, awaiting a subsequent event. The Vdd_flag signal is deasserted at 516 but in this case the recovery is not stored in NVM.

At 518, a flag signal indicates the occurrence of an error event which is not listed as a recognised error. At 520, a low-voltage indicator signal is received and stored by the error indicator module 300 into NVM 202. The assert module 212 generates a STOP command for the MCU, which at 522 puts the MCU into low power or STOP mode and deactivates the error indicator module 300.

While the error indicator module 200 has been described as registering a record of events affecting the MCU 102, it will be appreciated that the module can also be arranged to register records of other faults, errors or warning or other flag signals from the system in which the MCU 102 is installed.

It is possible for the error indicator module 200 to treat all fault and error events similarly. However in another example of implementation of the error indicator module 200, the assert module is controlled by the MCU to differentiate the output command signals so that different circumstances of the error or fault, or different combinations of error or fault signals together or with other warning or other flag signals, cause different reactions of the system. For example, a particular event signal that normally provokes an Interrupt command could provoke a Reset command if it occurs in presence of a specific warning or other flag, or if it occurs in combination with another error or fault event signal.

The error indicator module 200 described above reacts to individual error or fault event signals. In another example of implementation of the error indicator module 200, the latches such as 306 and 310 comprise double buffers so as to be able to capture simultaneous and quasi-simultaneous error or fault event signals. In this implementation, the capture of new error or fault event signals is then blocked only during the time taken to complete writing the data captured into NVM.

The error indicator module 200 is a hardware module, which responds to flag and other event signals by operation of circuits, minimising requirements for processor resources, which would be required in a software implementation and ensuring rapid and reliable registering in NVM of the records. The registering and storage of records of specific events by the hardware error indicator module 200 during operation of the MCU 102 is independent of software and applications running on the MCU. Such software and applications running on the MCU will often be proprietary functions installed by the customer and will not always contain standardised, mutually compatible, provision for recording fault and error events, if any provision is made.

The error indicator module 200 allows field returns to be analysed more efficiently by giving information about the state of a MCU during a failure scenario, thus reducing the number of cases diagnosed merely as 'No Trouble Found'. In turn, this enables a reduction in the cycle time for customer quality incident investigations and a reduction in unjustified warranty and liability claims. The data recorded can be used to aid device & application level failure analysis on commercial returns as well as during new product development and therefore to eliminate certain causes of failure that would otherwise remain undiagnosed.

The following hypothetical scenario illustrates a possible usage of the error indicator module 200 in an installation in a car having several MCUs such as 102 but without any error indicator hardware module such as 200 or 300. The car is driving along a street and passes a radar station which is close to the street. The electromagnetic interference from the radar station disturbs the functioning of one of the MCUs and causes its programme counter to load the operating system code wrongly, so that the instruction set jumps to a location different from the normal execution range (for example in RAM). The MCU 102 is secured by its separate watchdog MCU 124 (and/or by an internal watchdog function) but, before the watchdog refreshes the system, many (for example 1 000 to 50 000) wrong instructions are executed. If the real root cause of the behaviour is 'weak' hardware, it is likely that more cars of the same type will experience the same type of failure at the same radar station with the same symptoms and proper diagnosis of the error/fault and its root cause are needed.

Two cases of symptoms can appear in this example:
Case A—the MCU 102 works correctly after the event but its 'strange' behaviour has been noticed by the driver;
Case B—the MCU 102 remains non-operational after the event and exhibits a permanent malfunction.

In both cases, the driver refers the problem to the repair shop.

In the absence of an error indicator module such as 200, in case A, no failure can be found and even a known MCU storing Diagnostic Trouble Codes will not reveal the cause of the event, since such codes are deleted or over-written after a period of error-free operation. The incriminated MCU may be exchanged, under warranty for example, and returned to the vehicle manufacturer, who forwards it to the Tier 1 supplier for analysis. Any useful data in the MCU is lost when the MCU is disconnected from the battery, if it is not stored in NVM. No error is found by the Tier 1 supplier, who returns it to the MCU supplier, who reports 'No Trouble Found', since the product works correctly, and this result is confirmed by the Tier 1 supplier.

Although the part is working correctly, the reliability and quality statistics of the product, the MCU supplier and the Tier 1 supplier are penalised. Considerable work has been done on the incident without succeeding in finding the cause of the problem, which will never be found.

With an error indicator module such as 200, the event of electromagnetic interference would be signalled and the nature of the event registered in a record in the error indicator module in NVM 202. This record would be available for diagnosis at least at the MCU supplier, but possibly even at the Tier 1 supplier or the repair shop.

Even in case B, in the absence of an error indicator module such as 200, the incriminated MCU will be returned to the vehicle manufacturer, who forwards it to the Tier 1 supplier for analysis. The error can be reproduced, due to a wrong operating code location in flash memory, causing the programme to undergo periodic resets, for example. The Tier 1 supplier suspects potential errors or bugs in the programming of the MCU. The MCU supplier is brought in and joint investigation of the suspected programming faults, including risk analysis and testing are undertaken. Once again, even if the conclusion is that there is no fault in the MCU or its programme, the reliability and quality statistics of the product, the MCU supplier and the Tier 1 supplier are penalised. Considerable work has been done on the incident without succeeding in finding the real cause of the problem, which will never be found.

With an error indicator module such as 200, the event of electromagnetic interference and illegal operating code, reset, and write to flash would be signalled and the nature of the event registered in a record in the error indicator module in NVM 202 and would be available to aid the diagnosis.

An operating system (OS) is the software that manages the sharing of the resources of a computer or MCU and provides programmers with an interface used to access those resources. An operating system processes system data and user input, and responds by allocating and managing tasks and internal system resources as a service to users and programs of the system.

As used herein, the term "bus" is used to refer to a plurality of signals or conductors which may be used to transfer signals or power. The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Where the apparatus implementing the present invention is composed of electronic components and circuits known to those skilled in the art, circuit details have not been explained to any greater extent than that considered necessary for the understanding and appreciation of the underlying concepts of the present invention.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Where the context admits, illustrated hardware elements may be circuitry located on a single integrated circuit or within a same device or may include a plurality of separate integrated circuits or separate devices interconnected with each other.

Furthermore, it will be appreciated that boundaries described and shown between the functionality of circuit elements and/or operations in an embodiment of the invention are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In the claims, any reference signs placed between parentheses shall not be construed as limiting the claim. Where the context admits, terms such as "first" and "second" are used to distinguish arbitrarily between the elements such terms describe and these terms are not necessarily intended to indicate temporal or other prioritization of such elements.

The invention claimed is:

1. An automotive system comprising:
   a programmable microcontroller unit (MCU) configured to execute instructions to implement an automotive electronics control system; and
   an error indicator module configured to operate independently from the MCU, the error indicator module implemented in hardware and comprising:
      a sensor to generate an event signal, the event signal representative of an occurrence of an event having a potential to interfere with correct functionality of the MCU;
      a non-volatile memory, the non-volatile memory inaccessible by the MCU; and
      control logic configured to respond to the event signal by storing in the non-volatile memory a record of the event.

2. The system of claim 1, wherein the error indicator module is arranged to store the record of the event independently of software executed by the MCU external to the error indicator module.

3. The system of claim 1, wherein the error indicator module is arranged to trigger storing the record of the event on detection of a transition of the event signal.

4. The system of claim 1, wherein the error indicator module is arranged to store in the non-volatile memory a record to indicate the time as well as of the nature of the event.

5. The system of claim 1, wherein the error indicator module is arranged to latch a value representative of the record of the event to be stored, write the latched value to the non-volatile memory at an address, and increment the non-volatile memory address in preparation for a subsequent event signal.

6. The system of claim 1, wherein the error indicator module is further arranged to provide an output command signal to a watchdog MCU as a function of the nature of the event, in response to the event signal.

7. The system of claim 1, wherein the error indicator module further comprises a buffer configured to capture simultaneous or quasi-simultaneous event signals.

8. The system of claim 1, wherein the error indicator module is further arranged to respond to a signal representative of a recovery from the event by storing in the non-volatile memory a record of a recovery from the event.

9. The system of claim 1, wherein the error indicator module further comprises an assert module selectively responsive to the event signal to provide an output command signal as a function of the nature of the event.

10. A method comprising:
    receiving an event signal at an error indicator module included at an automotive electronics control system, the event signal representative of an event having a potential to interfere with correct functionality of a programmable microcontroller unit (MCU) included at the automotive electronics control system;
    storing at a non-volatile memory included at the error indicator module a record of the event, the non-volatile memory inaccessible by the MCU; and
    determining a cause for a failure at the MCU based on the record stored at the non-volatile memory.

11. The method of claim 10, further comprising:
    storing the record of the event independently of software executed by the MCU external to the error indicator module.

12. The method of claim 10, further comprising:
    triggering the storing the record of the event in response to detection of a transition of the event signal.

13. The method of claim 10, further comprising:
    storing at the non-volatile memory a record to indicate the time as well as of the nature of the event.

14. The method of claim 10, further comprising:
    latching a value representative of the record of the event to be stored;
    writing the latched value at the non-volatile memory at an address; and
    incrementing the non-volatile memory address in preparation for a subsequent event signal.

15. The method of claim 10, further comprising:
    providing, by the error indicator module, an output command signal to a watchdog MCU as a function of the nature of the event, in response to receiving the event signal.

16. The method of claim 10, further comprising:
    buffering event signals received at the error indicator module to provide recording of simultaneous or quasi-simultaneous event signals.

17. The method of claim 10, further comprising:
    receiving at the error indicator module a second event signal representative of a recovery from the event; and
    storing at the non-volatile memory a record of the recovery from the event.

18. The method of claim 10, further comprising:
    providing, by the error indicator module, a command signal to the MCU, the command signal a function of the nature of the event.

19. An error indicator module comprising:
    a sensor to monitor a first operating parameter;
    a capture module to generate an event signal based on the monitoring, the event signal indicating occurrence of an event having a potential to interfere with correct functionality of a programmable microcontroller unit (MCU), the MCU configured to implement an automotive electronics control system;
    a non-volatile memory;
    control logic configured to respond to the event signal by storing in the non-volatile memory a record of the event; and
    an assert module selectively responsive to the event signal to provide an output command signal as a function of the nature of the event,
    wherein the error indicator module is configured to operate independently from the MCU, and the non-volatile memory is inaccessible by the MCU.

20. The error indicator module of claim 19, wherein the control logic is arranged to store the record of the event independently of software executed by the MCU external to the error indicator module.

* * * * *